United States Patent
Li et al.

(10) Patent No.: US 9,917,301 B2
(45) Date of Patent: Mar. 13, 2018

(54) SOLID SOLUTION COMPOSITE LIMVO4-LINI-X-YCOXMNYO2 MATERIAL FOR RECHARGEABLE LITHIUM ION BATTERIES

(75) Inventors: Jun Li, Ningbo (CN); Jinhua He, Ningbo (CN); Zhenlian Chen, Ningbo (CN); Xianhui Zhang, Ningbo (CN); Yuanhao Tang, Ningbo (CN); Deyu Wang, Ningbo (CN)

(73) Assignees: NINGBO INSTITUTE OF MATERIALS TECHNOLOGY & ENGINEERING CHINESE ACADEMY OF SCIENCES, Ningbo (CN); GUANGDONG KEPRIME ENERSTORE LTD, Guangzhou (CN)

( * ) Notice: Subject to any disclaimer, the term of this patent is extended or adjusted under 35 U.S.C. 154(b) by 333 days.

(21) Appl. No.: 14/419,127

(22) PCT Filed: Aug. 1, 2012

(86) PCT No.: PCT/CN2012/079486
§ 371 (c)(1),
(2), (4) Date: May 13, 2015

(87) PCT Pub. No.: WO2014/019162
PCT Pub. Date: Feb. 6, 2014

(65) Prior Publication Data
US 2015/0243968 A1    Aug. 27, 2015

(51) Int. Cl.
| | |
|---|---|
| H01M 4/36 | (2006.01) |
| H01M 4/62 | (2006.01) |
| H01M 4/485 | (2010.01) |
| H01M 4/525 | (2010.01) |
| H01M 4/505 | (2010.01) |
| H01M 10/0525 | (2010.01) |
| H01M 4/04 | (2006.01) |
| H01M 4/131 | (2010.01) |
| H01M 4/1391 | (2010.01) |
| H01M 4/58 | (2010.01) |
| H01M 4/02 | (2006.01) |
| H01M 10/052 | (2010.01) |

(52) U.S. Cl.
CPC ......... *H01M 4/364* (2013.01); *H01M 4/0471* (2013.01); *H01M 4/131* (2013.01); *H01M 4/1391* (2013.01); *H01M 4/485* (2013.01); *H01M 4/505* (2013.01); *H01M 4/525* (2013.01); *H01M 4/5825* (2013.01); *H01M 4/623* (2013.01); *H01M 4/625* (2013.01); *H01M 10/0525* (2013.01); H01M 4/622 (2013.01); H01M 10/052 (2013.01); H01M 2004/028 (2013.01); Y10T 29/49108 (2015.01)

(58) Field of Classification Search
None
See application file for complete search history.

(56) References Cited

U.S. PATENT DOCUMENTS

| | | | |
|---|---|---|---|
| 2009/0068566 A1 | 3/2009 | Park et al. | |
| 2009/0087709 A1* | 4/2009 | Zaghib | C09D 5/00 429/493 |
| 2009/0220860 A1* | 9/2009 | Xi | C01G 30/00 429/220 |
| 2010/0028776 A1* | 2/2010 | Park | H01M 4/366 429/221 |

FOREIGN PATENT DOCUMENTS

| | | | |
|---|---|---|---|
| CN | 101017896 | | 8/2007 |
| CN | 101488568 | | 7/2009 |
| JP | 2004-047180 | * | 2/2004 |
| JP | 2007-188699 | | 7/2007 |

OTHER PUBLICATIONS

English language translation of International Search Report for PCT/CN2012/079486, 3 pages total.
Hashem et al., "Study of the surface modification of LiNi1/3Co1/3Mn1/3O2 cathode material for lithium ion battery," Journal of Power Sources, 196 (2011) pp. 8632-8637.

* cited by examiner

*Primary Examiner* — Tanisha Diggs
(74) *Attorney, Agent, or Firm* — Hamre, Schumann, Mueller & Larson, P.C.

(57) ABSTRACT

Described herein are solid solution composites that are used as cathode materials for lithium-ion batteries. The solid solution composite of α $LiMVO_4$-β$LiNi_{1-x-y}Co_xMn_yO_2$, in which $LiMVO_4$ has cubic close-packed structure, $LiNi_{1-x-y}Co_xMn_yO_2$ has hexagonal layered structure, and both share an oxygen lattice fully or partly. The new solid solution materials have advantage for lithium-ion batteries that the working voltage of the composite is adjustable by controlling the molar ratio of α and β and have higher working voltage than current secondary battery materials. Also described herein are methods of preparing such composite.

7 Claims, 6 Drawing Sheets

SOLID SOLUTION COMPOSITE LIMVO4-LINI-X-YCOXMNYO2 MATERIAL FOR RECHARGEABLE LITHIUM ION BATTERIES

FIELD OF THE INVENTION

Described herein are a new solid solution composite, and methods of its preparation as well as its application in alkali-ion secondary (rechargeable) batteries, particularly lithium-ion batteries.

BACKGROUND ARTS

Alkali-ion secondary (rechargeable) batteries, such as rechargeable lithium-ion batteries, as high-capacity batteries have been used as the most promising portable energy storage system for a broad range of areas. Lithium-ion battery can not only offer energy densities 2-3 times and power densities 5-6 times higher than Ni—NH, Ni—Cd, and Pb acid batteries but also has many advantages such as long cycle life, low self discharge, high operating voltage, wide temperature window, and no "memory effect", while cathode materials have hindered the development of lithium-ion battery. The layered transition metal oxide $LiNi_{1-x-y}Co_xM-n_yO_2$ has drawn significant attention as a nee cathode material of lithium-ion battery. The study shows that the layered transition metal oxides have many advantages such as higher theory reversible capacity, good structural flexibility and stability, fast Li ion diffusion, long cycle life, improved safety, high operating voltage, low cost, and environmental benignity. However the energy density of lithium-ion battery is low at the present, which cannot satisfy the electric vehicle's requirement in energy density. Therefore, developing a new material with high energy density for lithium-ion battery is an urgent task.

SUMMARY OF THE INVENTION

Presented herein are new solid solution composite materials usable as cathode materials for rechargeable lithium batteries.

In the first aspect, the invention provides a solid solution composite for lithium ion batteries having the formula $\alpha LiMVO_4$-$\beta LiNi_{1-x-y}Co_xMn_yO_2$, in which $LiMVO_4$ has cubic close packed structure, $LiNi_{1-x-y}Co_xMn_yO_2$ has hexagonal layered structure, and both share a cubic or hexagonal close-packed oxygen sub-lattice fully or partly.

In a preferred embodiment, molar ratio of $\alpha$ ($LiMVO_4$) and $\beta$ ($LiNi_{1-x-y}Co_xMn_yO_2$) is from 5:1 to 1:5, more preferably 5:1 to 1:1.

In another preferred embodiment, the working voltage of the composite is adjustable by controlling the molar ratio of $\alpha$ and $\beta$ and the working voltage higher than current secondary battery materials.

In another preferred embodiment, M is selected from the group consisting of Al, Sc, Ti, Cr, Mn, Fe, Co, Ni, Cu, Zn, and mixtures thereof and $0 \leq x \leq 1$, $0 \leq y \leq 1$, $x+y \leq 1$.

In the second aspect, the invention provides a method for synthesizing the composite provided by the invention, comprising the steps of: a) $LiMVO_4$, and $LiNi_{1-x-y}Co_xMn_yO_2$ are mixed at the molar ratio from 5:1 to 1:5 (preferably 5:1 to 1:1), and b) the mixture is calcined under temperature of 300-1000° C. about 15-50 h to obtain the composite in accordance with claim 1.

In a preferred embodiment, both $LiMVO_4$ and $LiNi_{1-x-y}Co_xMn_yO_2$ are prepared respectively by the method selected from solid-phase ball milling, sol-gel method, spray drying method, coprecipitation, combustion synthesis, or hydrothermal method.

In the third aspect, the invention provides the use of the composite provided by the invention for the manufacturing of a rechargeable lithium ion battery as cathode materials.

In the fourth aspect, the invention provides the use of the composite provided by the invention for the manufacturing of a rechargeable lithium ion batteries, wherein the lithium ion batteries contains an anode, a cathode, and an electrolyte, the cathode comprising a solid solution composite material as provided by the invention.

In a preferred embodiment, the cathode further comprises a conductive additive and a polymeric binder that comprises a salt comprising $Li^+$ cations.

In a preferred embodiment, the composite is as cathode for rechargeable lithium ion batteries, and the anode comprises a compound selected from a lithium-carbon intercalation compound, a lithium-silicon intercalation compound, a lithium-transition metal oxides, a lithium-transition metal nitrides, or a lithium-titanium spinel compound; the adhesive agent of cathode material is PVDF, the conductive additive is selected from Super P, carbon black, carbon nanotubes or graphene, polymeric binder is selected from the group consisting of a homopolymer of tetrafluoroethylene, a copolymer of tetrafluoroethylene, an ethylene-propylene-dieneterpolymer, a polyether, a polyester, a methylmethacrylate-based polymer, an acrylonitrile-based polymer, or a vinylidene fluoride-based polymer.

Hereby, the present invention provides a new material with high energy density for lithium ion battery.

ILLUSTRATION

FIG. 1 shows the results the oxygen arrays are both cubic close-packed in inverse-spinel structure $LiNiVO_4$ (FIG. 1A) and layered structure $LiNi_{1-x-y}Co_xMn_yO_2$ (FIG. 1B). In the inverse-spinel $LiNiVO_4$, the Li ions and Ni ions randomly occupy the octahedral $16d$ sites, leaving half octahedral sites vacant; the V ions occupy the tetrahedral $8a$ sites, sandwiched by oxygen layers and Li/Ni layers. In the layered structure $LiNi_{1-x-y}Co_xMn_yO_2$, both Li ions and M ions site on octahedral sites, stacking along hexagonal c axis alternately. In FIG. 1A and FIG. 1B, three unit slabs (structure unit) stack along hexagonal c axis. The super structure (FIG. 1C) is constructed through stacking one $LiNi_{1-x-y}Co_xMn_yO_2$ slabs and two $LiNiVO_4$ slab along hexagonal c axis; the structure of FIG. 1D is the same as that of FIG. 1C but with different ratio, which has no influence on crystal structure.

DETAILED DESCRIPTION OF THE INVENTION

Figure 1A:
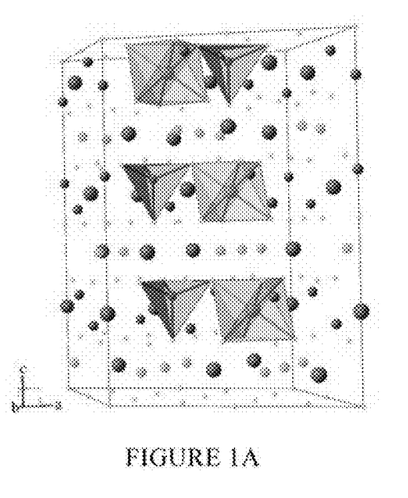
Figure 1B:
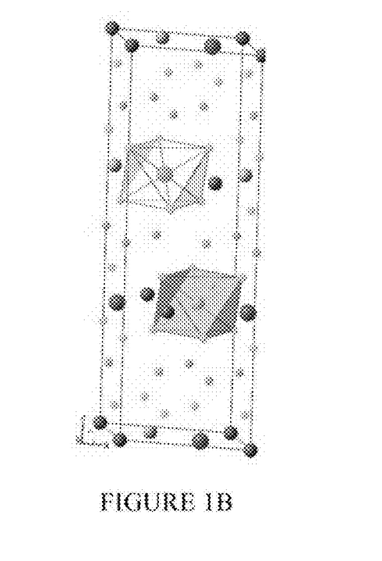
Figure 1C:
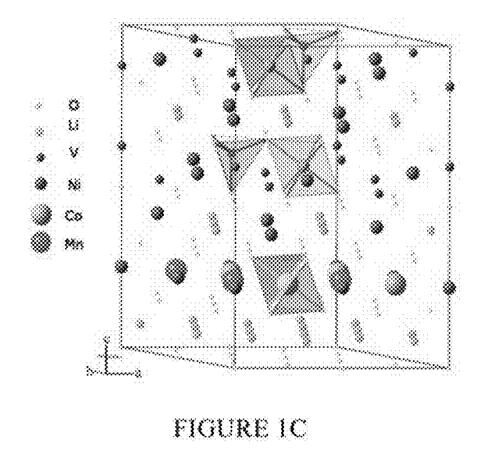
Figure 1D:
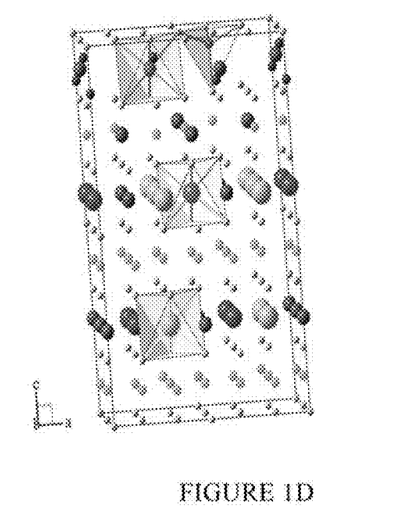
Figure 2:
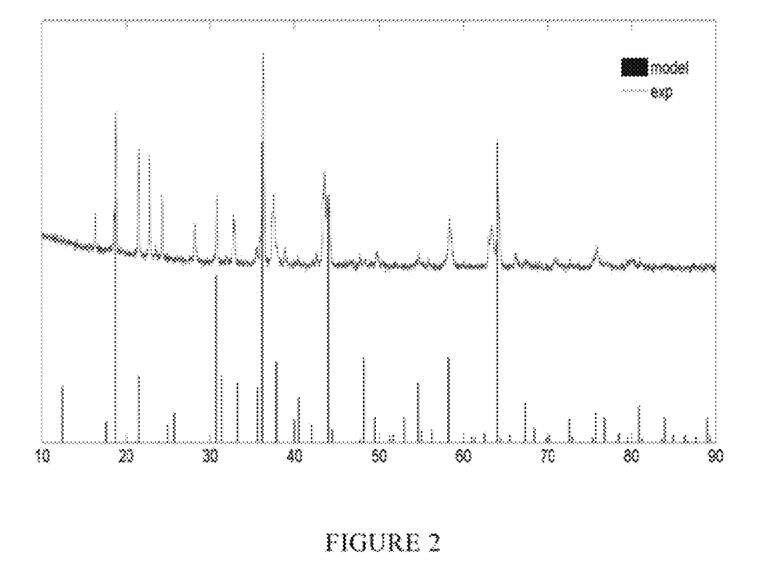
FIG. 2 shows the results of an X-ray diffraction analysis of $LiMVO_4$-$LiNi_{1-x-y}Co_xMn_yO_2$ simulated and experimental of Example 1 using Cu $K_\alpha$ radiation, $\lambda=1.5404$ Å. It shows that the results of the experiment are almost the same as that of theoretical simulation.
Figure 3:
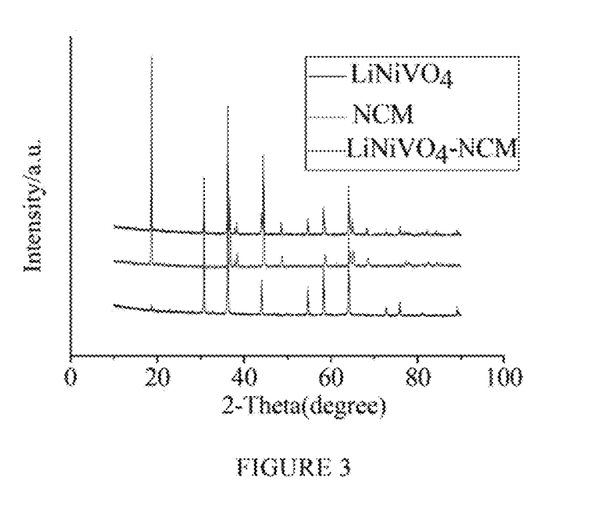
FIG. 3 shows XRD of $LiNiVO_4$—$LiNi_{1/3}Co_{1/3}Mn_{1/3}O_2$ mixed directly by molar ratio of 1:1 as in Example 1. $LiNiVO_4$ and $LiNi_{1/3}Co_{1/3}Mn_{1/3}O_2$ have typical inverse-spinel structure and typical layer structure separately. No new diffraction peak appears on the XRD. The number of diffraction peaks after mixing is equal to that of $LiNiVO_4$ plus that of $LiNi_{1/3}Co_{1/3}Mn_{1/3}O_2$ and the position of the peaks are not changed.
Figure 4:
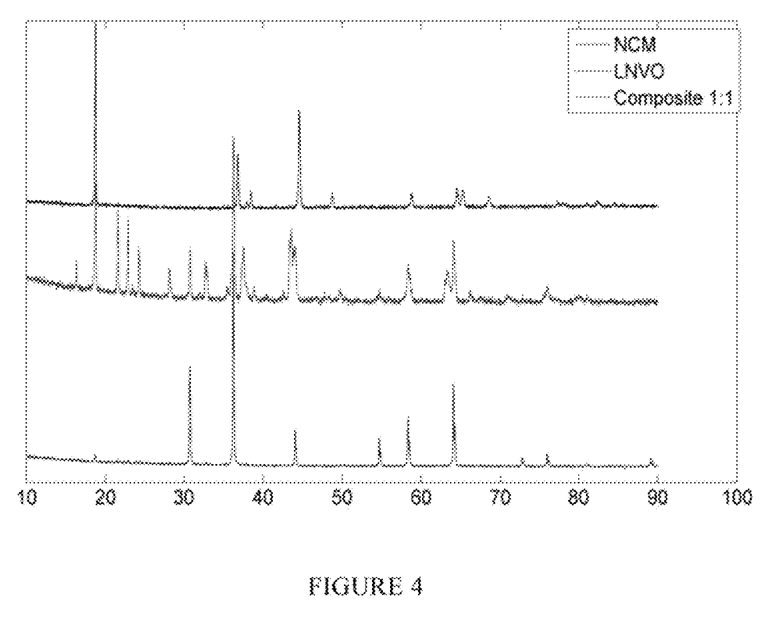
FIG. 4 shows the results of the power X-ray diffraction analysis of $LiNiVO_4$, $LiNi_{1/3}Co_{1/3}Mn_{1/3}O_2$ and $LiNiVO_4$—$LiNi_{1/3}Co_{1/3}Mn_{1/3}O_2$ prepared as above, using Cu $K_\alpha$ radiation, $\lambda=1.5404$ Å. The crystal structure of $LiNiVO_4$ is determined to be a cubic inverse spinel having a space group Fd-3m. The crystal structure of $LiNi_{1/3}Co_{1/3}Mn_{1/3}O_2$ is determined to be an ordered hexagonal structure, and there is a lot of new diffraction peaks of $LiNiVO_4$—$LiNi_{1/3}Co_{1/3}Mn_{1/3}O_2$ appeared after calcinations. The structure of $LiNiVO_4$—$LiNi_{1/3}Co_{1/3}Mn_{1/3}O_2$ is close to that of theoretical calculation, which means a new solid solution is formed.
Figure 5A:
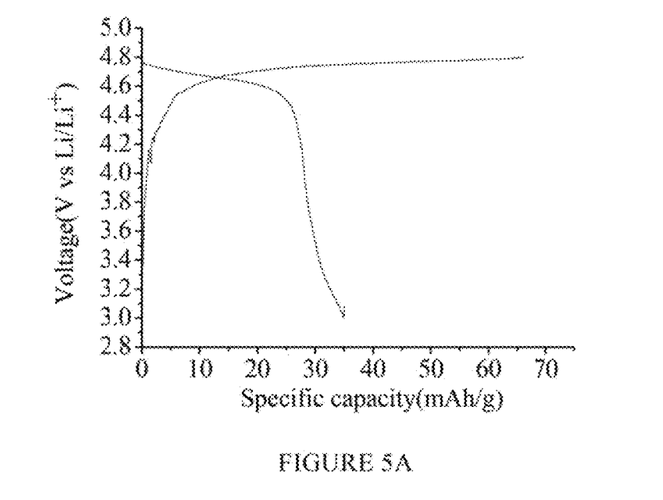
FIG. 5A and FIG. 5B shows discharge/charge plot of $LiNiVO_4$ and $LiNi_{1/3}Co_{1/3}Mn_{1/3}O_2$ respectively in example 1.
Figure 5B:
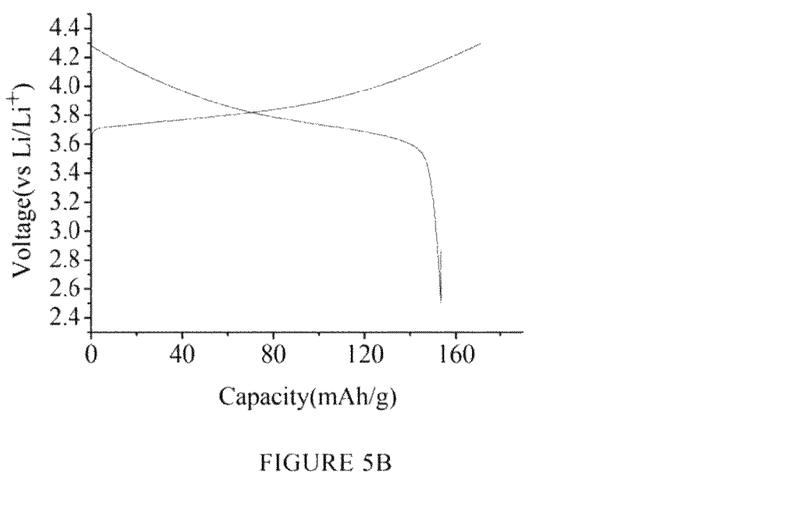
Figure 5C:
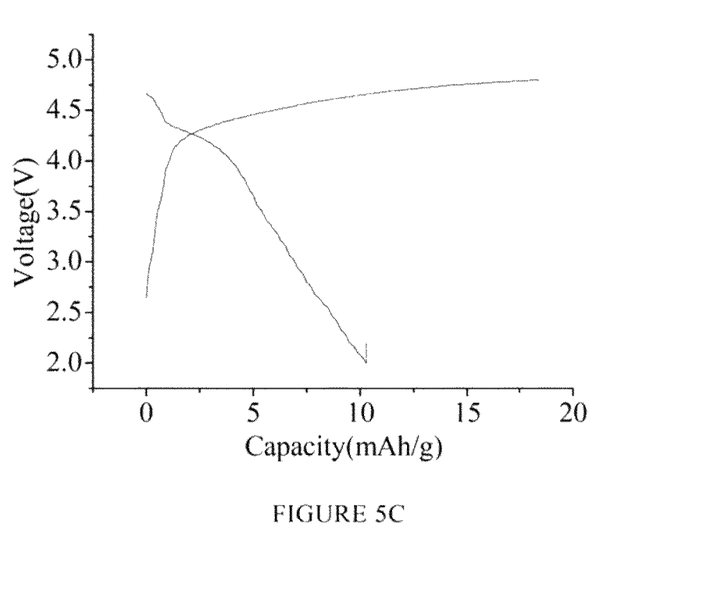
FIG. 5C shows discharge/charge plot at 15 mA/g for $LiNiVO_4$—$LiNi_{1/3}Co_{1/3}Mn_{1/3}O_2$ in Example 1.
Figure 5D:
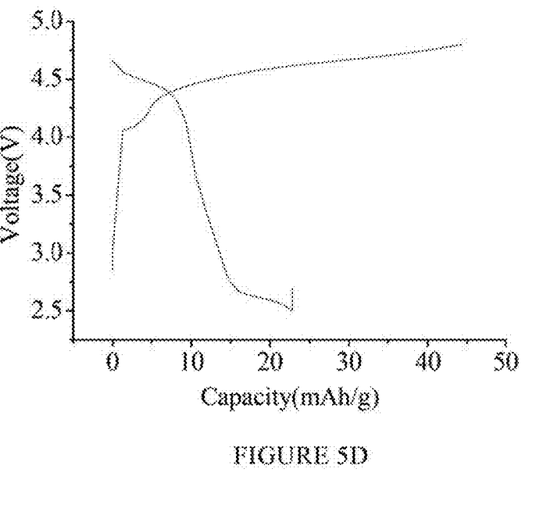
FIG. 5D shows discharge/charge plot at 15 mA/g or $LiNiVO_4$—$LiNi_{1/3}Co_{1/3}Mn_{1/3}O_2$ as in example 2. There are obvious differences between FIG. 5C, 5D and FIG. 5A, 5B. The plateau voltage of $LiNiVO_4$—$LiNi_{1/3}Co_{1/3}Mn_{1/3}O_2$ is around 4.3V, which is neither that of $LiNiVO_4$ nor that of $LiNi_{1/3}Co_{1/3}Mn_{1/3}O_2$. It means $LiNiVO_4$—$LiNi_{1/3}Co_{1/3}Mn_{1/3}O_2$ is a new solid solution. The new solid solution is a kind of lithium-ion battery material with both electrochemical activity and high voltage.

The inventor finds a composite formed by cubic close-packed inverse spinel structure $LiMVO_4$ and hexagonal layered structure $LiNi_{1-x-y}Co_xMn_yO_2$, which can form solid solution. The solid solution material presents electrochemical activity as cathode for lithium-ion battery.

Composite

The term "composite" and "solid solution material" can be used alternatively in the invention, described herein is a new solid solution material with composite super structure constructed of cubic close-packed inverse spinel structure $LiMVO_4$ and hexagonal layered structure $LiNi_{1-x-y}Co_xMn_yO_2$, the molar ratio between $LiMVO_4$ and $LiNi_{1-x-y}Co_xMn_yO_2$ is adjustable, such as but not limited to 5-1:1-5, more preferably 3-2:2-3, most preferably 1:1. The composite has solid solution between cubic structure and hexagonal structure, and can share the oxygen sublattice completely or partially.

The precursor $LiMVO_4$ of the composite is with space group $Fd\overline{3}m$, and the precursor $LiNi_{1-x-y}Co_xMn_yO_2$ is with space group $R\overline{3}m$. M is metal element which is selected from the group consisting of Al, Sc, Ti, Cr, Mn, Fe, Co, Ni, Cu, Zn, and mixtures thereof and wherein $0 \le x \le 1$, $0 \le y \le 1 \le x+y \le 1$.

The new solid solution supplied by the invention can improve the energy density of material owing to high plateau voltage.

Preparation of Composite

The Preparation of $LiMVO_4$

The $LiMVO_4$ can be prepared by the methods disclosed in the prior art, such as but not limited to sol-gel method, spray drying method, coprecipitation, hydrothermal method, and combustion synthesis.

The Preparation of $LiNi_{1-x-y}Co_xMn_yO_2$

The $LiNi_{1-x-y}Co_xMn_yO_2$ can be prepared by the methods disclosed in the prior art, such as but not limited to solid state reaction method, sol-gel method, spray drying method, coprecipitation, hydrothermal method, and combustion synthesis.

The Preparation of $LiMVO_4$-$LiNi_{1-x-y}Co_xMn_yO_2$

The $LiMVO_4$-$LiNi_{1-x-y}Co_xMn_yO_2$ can be prepared by the solid state reaction method. $LiMVO_4$ and $LiNi_{1-x-y}Co_xMn_yO_2$ were mixed in molar ratio of $\alpha$ ($LiMVO_4$):$\beta$ ($LiNi_{1-x-y}Co_xMn_yO_2$), but not limited to, from 5:1 to 1:5 and by ball milling, after that, the mixture was pelleted and calcined at 300-1000° C. at heating rate 3-8° C./min about 3-50 h.

Use of Composite

In one aspect, described herein is a solid solution material, which exhibits electrochemical activity. The composite upon electrochemical interaction, release lithium ions, and is capable of reversibly cycling lithium ions. The solid solution material was used as cathode materials in rechargeable lithium battery.

$LiMVO_4$-$LiNi_{1-x-y}Co_xMn_yO_2$ composite cathode was prepared, for example, by thoroughly mixing the active material (80%) with Super P carbon (10%) and polyvinylidene fluoride (10%) in N-methyl-pyrrolidinone, then the slurry was cast on aluminum foil and dried at 110-130° C. for 5-15 h in vacuum. The resulting electrode film was subsequently pressed and punched into a circular disc with 14 mm, the metal Li as counter-electrode(anode), the coin type half-cell was assembled in an argon-filled glove box with a CR2032, and the electrolyte solution used was 1M $LiPF_6$ in a mixture of ethylene carbonate-diethyl carbonate (volume=1:1).

Example 1

Formation of Active Materials (1) The Preparation of $LiNiVO_4$

The $LiNiVO_4$ was prepared by the solid state reaction method. $Li_2CO_3$, $NiCO_3$, $NH_4VO_4$ were used as the starting materials in molar ratio of 1.05:1:1 by ball-milling in ethanol and then dried at 80° C. for 2 h, after that, the mixture was pelleted and heated with a heating rate 5° C./min and constant temperature 450° C. with 3 h in a horizontal quartz tube under air.

(2) The Preparation of $LiNi_{1/3}Co_{1/3}Mn_{1/3}O_2$

The $Ni_{1/3}Co_{1/3}Mn_{1/3}(OH)_2$ was synthesized by dissolving stoichiometric amounts of $Ni(CH_3COO)_2 \cdot 4H_2O$, $Co(CH_3COO)_2 \cdot 4H_2O$ and $Mn(CH_3COO)_2 \cdot 4H_2O$ in distilled water (cationic ratio of Ni:Co:Mn=1:1:1) and the concentration of the total metal acetate was 2 mol/L. The aqueous solution was precipitated by adding NaOH (2M)/$NH_4OH$ (0.2M) along with continued stirring. The solution was maintained at 50° C. for 24 h and the pH was controlled to 10-11. A green brown mixed hydroxide was precipitated. After filtering and washing, the hydroxide precipitate was dried at 120 for 24 h to remove the adsorbed water. $Ni_{1/3}Co_{1/3}Mn_{1/3}(OH)_2$ and $LiOH \cdot H_2O$ were mixed (molar ratio is 1:1.05), presintered 5 h under 480° C. in the air and then calcined 20 h under 900° C. to obtain spherical material of $LiNi_{1/3}Co_{1/3}Mn_{1/3}O_2$.

(3) The Preparation of $LiNiVO_4$—$LiNi_{1/3}Co_{1/3}Mn_{1/3}O_2$ $LiNiVO_4$—$LiNi_{1/3}Co_{1/3}Mn_{1/3}O_2$ was prepared by the solid state reaction method. $LiNiVO_4$, $LiNi_{1/3}Co_{1/3}Mn_{1/3}O_2$ was mixed in molar ratio of 1:1 and by ball milling, after that, the mixture was pelleted and heated with a heating rate 5° C./min and constant temperature 700° C. with 5 h in a horizontal quartz tube under air.

Example 2

(1) The Preparation of $LiNiVO_4$

The $LiNiVO_4$ was prepared by the solid state reaction method. $Li_2CO_3$, $NiCO_3$, $NH_4VO_4$ were used as the starting materials in molar ratio of 1.05:1:1 by ball-milling in ethanol and then dried at 80° C. for 2 h, after that, the mixture was pelleted and heated with a heating rate 5° C./min and constant temperature 450° C. with 3 h in a horizontal quartz tube under air.

(2) The Preparation of $LiNi_{1/3}Co_{1/3}Mn_{1/3}O_2$

The $Ni_{1/3}Co_{1/3}Mn_{1/3}CO_3$ was synthesized by dissolving stoichiometric amounts of $NiSO_4 \cdot 6H_2O$, $CoSO_4 \cdot 7H_2O$ and $MnSO_4 \cdot 5H_2O$ in distilled water (cationic ratio of Ni:Co:Mn=1:1:1) and the concentration of the total metal acetate was 2 mol/L. The aqueous solution was precipitated by adding $Na_2CO_3$ (2M)/$NH_4OH$ (0.2M), along with continued stirring. The solution was maintained at 80° C. for 12 h and the pH was controlled to 7-8. Then, filtered, washed, and dried. A green brown mixed hydroxide was precipitated. After filtering and washing, the $Ni_{1/3}Co_{1/3}Mn_{1/3}CO_3$ was dried at 120° C. for 24 h to remove the adsorbed water. Finally $Ni_{1/3}Co_{1/3}Mn_{1/3}CO_3$ was mixed with a stoichiometric amount $LiOH \cdot H_2O$ and preheated to 500° C. for 4 h in the air, and then it was calcined at 900° C. for 15 h in the air followed by cooling to room temperature to obtain spherical $LiNi_{1/3}Co_{1/3}Mn_{1/3}O_2$ power.

(3) The Preparation of $LiNiVO_4$—$LiNi_{1/3}Co_{1/3}Mn_{1/3}O_2$ $LiNiVO_4$—$LiNi_{1/3}Co_{1/3}Mn_{1/3}O_2$ was prepared by the solid state reaction method. $LiNiVO_4$, $LiNi_{1/3}Co_{1/3}Mn_{1/3}O_2$ was mixed in molar ratio of 2:1 and by ball milling, after that, it was calcined at 700° C. for 10 h in air to obtain $LiNiVO_4$—$LiNi_{1/3}Co_{1/3}Mn_{1/3}O_2$ power.

Example 3

(1) The Preparation of $LiNiVO_4$

First $Li(CH_3COO)_2 \cdot H_2O$, $Ni(CH_3COO)_2 \cdot 4H_2O$, $NH_4VO_3$ were dissolved in distilled water with molar ratio of 1.05:1:1 and then mixed with saturated solution of citric acid, and the ratio of citric acid to metal ions was 1:1. The pH of the resultant solution mixture was maintained at about 5 by adding ammonium hydroxide solution. Viscous gel was obtained by stirring the solution 5 h maintained at 85° C. Viscous gel was dried at 120° C. for 24 h in a vacuum box to obtain xerogel. The xerogel was heated to 450° C. for 4 h in air followed by cooling to room temperature.

(2) The Preparation of $LiNi_{1/3}Co_{1/3}Mn_{1/3}O_2$

First, appropriate quantities of $Li(CH_3COO)_2 \cdot H_2O$, $Ni(CH_3COO)_2 \cdot 4H_2O$, $Co(CH_3COO)_2 \cdot 7H_2O$, $Mn(CH_3COO)_2 \cdot 4H_2O$ were dissolved in distilled water and mixed with saturated solution of oxalic acid, and the ratio of oxalic acid to metal ions was 1:1. The pH of the resultant solution mixture was maintained at about 9.0 by adding ammonium hydroxide solution. Viscous gel was obtained by stirring the solution 5 h maintained at 85° C. Viscous gel was dried at 120° C. for 24 h in a vacuum box to obtain xerogel. The xerogel was heated to 400° C. for 4 h in air and then cooled to room temperature. The precursor thus obtained was grounded and calcined at 900° C. for 15 h in air followed by cooling to room temperature.

(3) The Preparation of $LiNiVO_4$—$LiNi_{1/3}Co_{1/3}Mn_{1/3}O_2$ $LiNiVO_4$—$LiNi_{1/3}Co_{1/3}Mn_{1/3}O_2$ was prepared by solid-phase ball milling. First the obtained $LiNiVO_4$ and $LiNi_{1/3}Co_{1/3}Mn_{1/3}O_2$ was mixed with molar ratio of 3:1, then added Ethanol and ball milling 4 h with speed 580 r/min, after that, the ball milling precursor was calcined at 600° C. for 10 h in air followed by cooling to room temperature.

Electrode Preparation $LiMVO_4$-$LiNi_{1-x-y}Co_xMn_yO_2$ Composite cathode was prepared by thoroughly mixing the active material (80%) with Super P carbon (10%) and polyvinylidenefluoride (10%) in N-methyl-pyrrolidinone, then the slurry was cast on aluminum foil and dried at 120° C. for 10 h in vacuum. The resulting electrode film was subsequently pressed and punched into a circular disc with 14 mm, the metal Li as counter-electrode(anode), the coin type half-cell was assembled in an argon-filled glove box with a CR2032, and the electrolyte solution used was 1M $LiPF_6$ in a mixture of ethylene carbonate-diethyl carbonate(volume=1:1). The cells were cycled at 15 mA/g between 2.0 and 4.8V with a LAND battery testing system.

The examples and embodiments described herein are for only illustrative purposes and various modifications or changes suggested to persons skilled in the art are to be included within the spirit and purview of this application and scope of the appended claims.

What is claimed is:

1. A solid solution composite for lithium ion batteries having the formula $\alpha(LiMVO_4)$-$\beta(LiNi_{1-x-y}Co_xMn_yO_2)$, wherein $LiMVO_4$ has a cubic close-packed structure, $LiNi_{1-x-y}Co_xMn_yO_2$ has a hexagonal layered structure, and both share a cubic or hexagonal close-packed oxygen sublattice fully or partly,
    wherein $\alpha$ represents an amount of $LiMVO_4$, $\beta$ represents an amount of $LiNi_{1-x-y}Co_xMn_yO_2$, and a molar ratio of $\alpha$ to $\beta$ is from 5:1 to 1:5,
    M is selected from the group consisting of Al, Sc, Ti, Cr, Mn, Fe, Co, Ni, Cu, Zn, and mixtures thereof and $0 \leq x \leq 1$, $0 \leq y \leq 1$, $x+y \leq 1$, and
    the solid solution composite is obtained by calcination of a mixture of $LiMVO_4$ and $LiNi_{1-x-y}Co_xMn_yO_2$ under temperature of 300-1000° C. for about 15-50 h, wherein new diffraction peaks on the X-ray diffraction analysis of the solid solution composite appeared after calcination.

2. The solid solution composite of claim 1, wherein the working voltage of the composite is adjustable by controlling the molar ratio of $\alpha$ to $\beta$ and,
    the working voltage of the solid solution composite is 4.3V to 4.8V.

3. A method of synthesizing the solid solution composite in accordance with claim 1, wherein comprising the steps of: a) $LiMVO_4$, and $LiNi_{1-x-y}Co_xMn_yO_2$ are mixed at the molar ratio from 5:1 to 1:5, and b) the mixture is calcined under temperature of 300-1000° C. about 15-50 h to obtain the composite.

4. The method of claim 3, wherein both $LiMVO_4$ and $LiNi_{1-x-y}Co_xMn_yO_2$ are prepared respectively by the method selected from solid-phase ball milling, sol-gel method, spray drying method, coprecipitation, combustion synthesis, or hydrothermal method.

5. A method of using the solid solution composite in accordance with claim 1 for the manufacturing of a rechargeable lithium ion batteries, wherein the lithium ion batteries contains an anode, a cathode, and electrolyte, the cathode comprising the solid solution composite.

6. The method of using the solid solution composite in accordance with claim 5, wherein the cathode further comprises a conductive additive, an adhesive agent and a polymeric binder that comprises a salt comprising $Li^+$ cations.

7. The method of using the solid solution composite in accordance with claim 6, wherein the anode comprises a compound selected from a lithium-carbon intercalation compound, a lithium-silicon intercalation compound, a lithium-transition metal oxides, a lithium-transition metal nitrides, or a lithium-titanium spinel compound; the adhesive agent is polyvinylidene fluoride, the conductive additive is selected from carbon black, carbon nanotubes or graphene, the polymeric binder is selected from the group consisting of a homopolymer of tetrafluoroethylene, a copolymer of tetrafluoroethylene, an ethylene-propylene-dieneterpolymer, a polyether, a polyester, a methylmethacrylate-based polymer, an acrylonitrile-based polymer, or a vinylidene fluoride-based polymer.

\* \* \* \* \*